Figure 13:
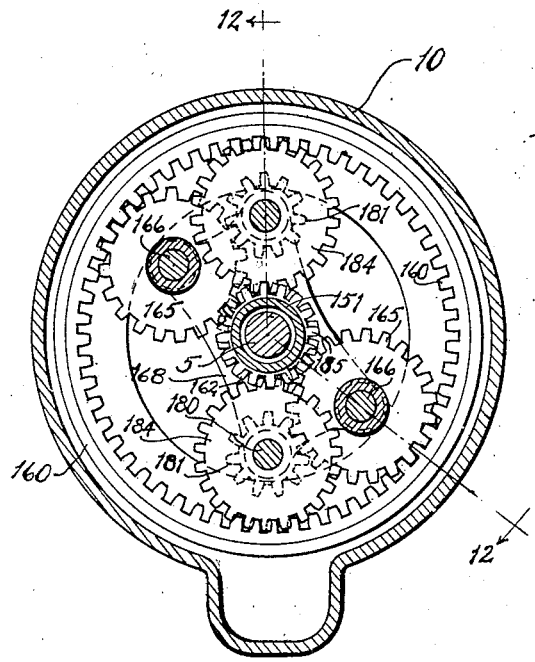

T. & G. VON ZWEIGBERGK.
CONTROLLING MECHANISM FOR AUTOMOBILES.
APPLICATION FILED NOV. 1, 1915.
1,287,171.
Patented Dec. 10, 1918.
7 SHEETS—SHEET 1.
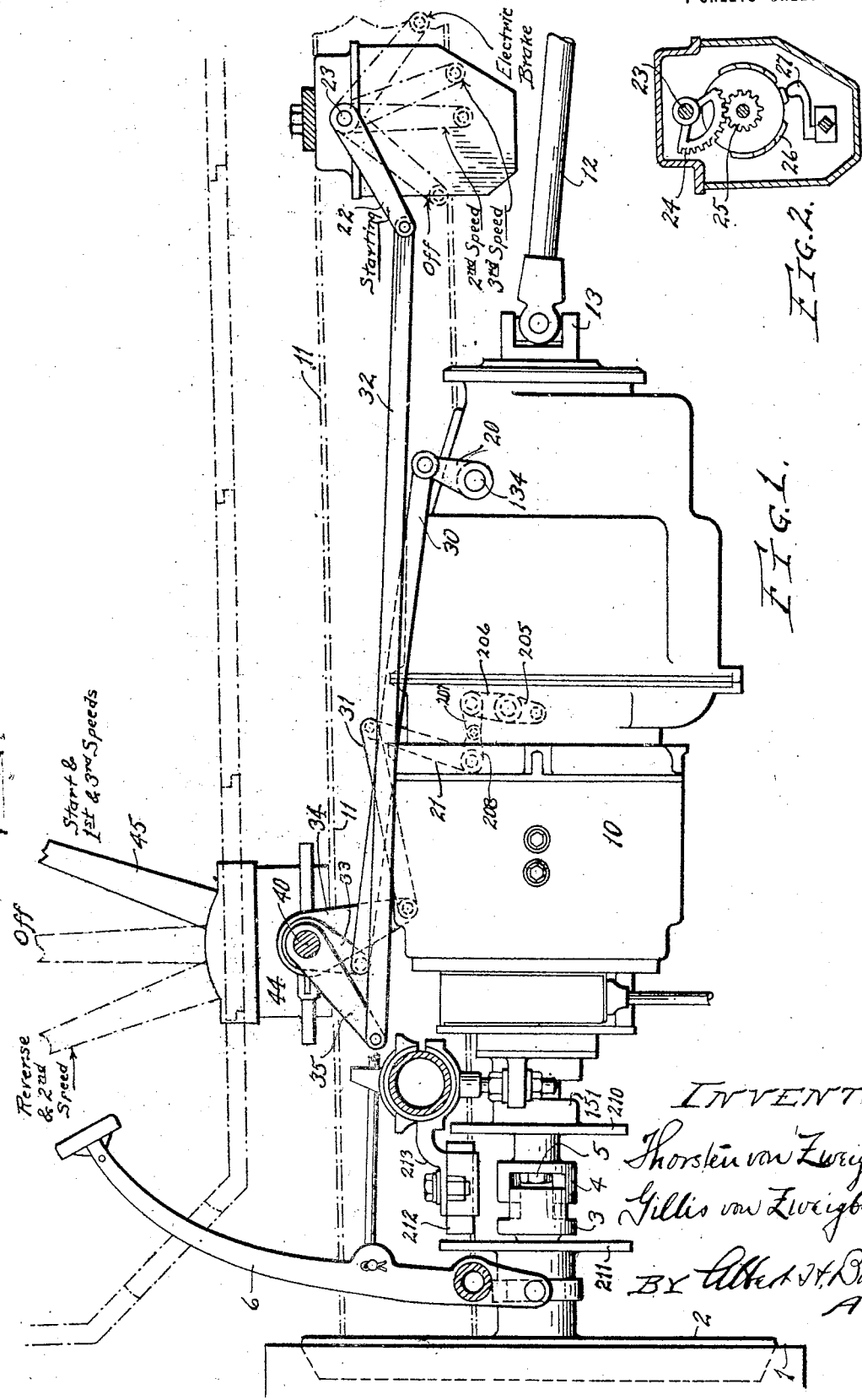

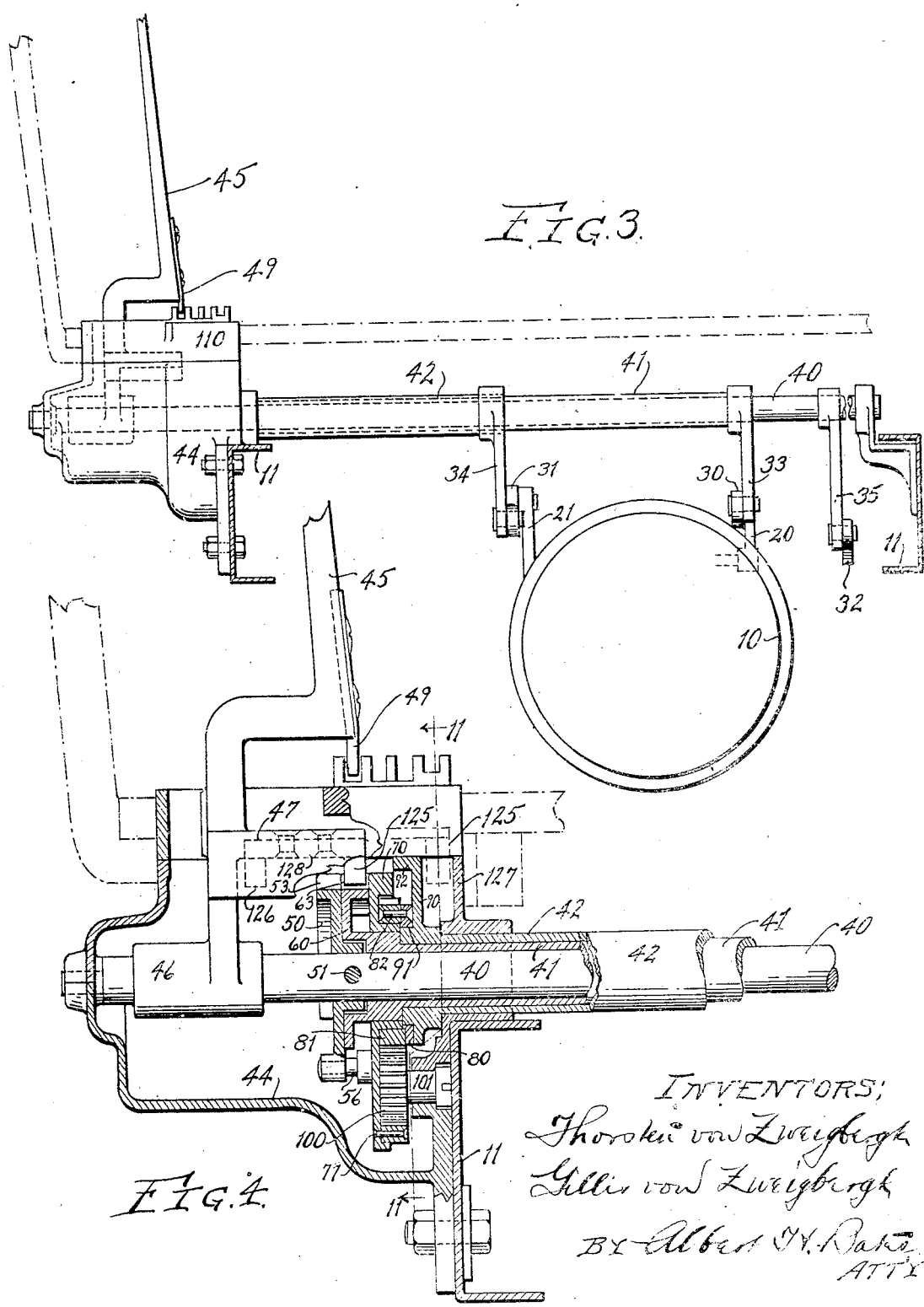

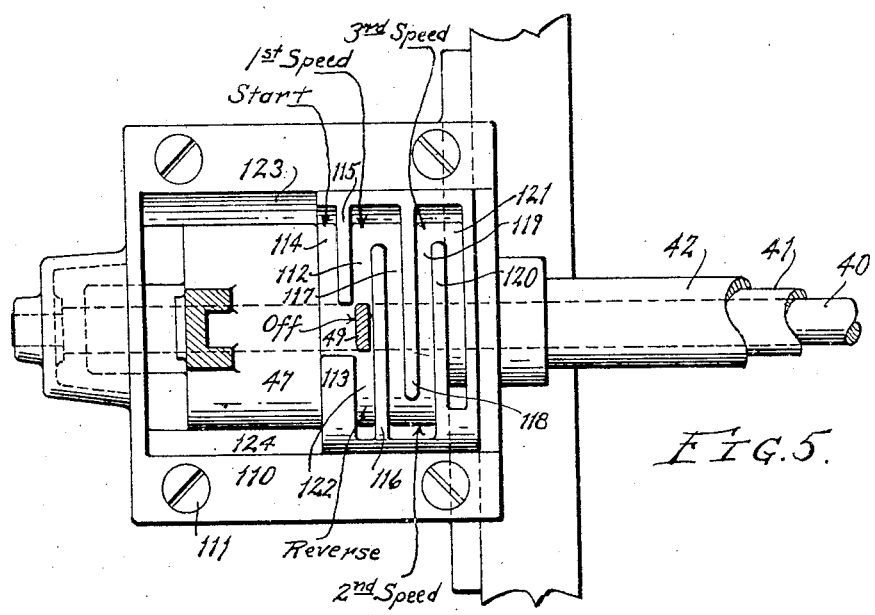
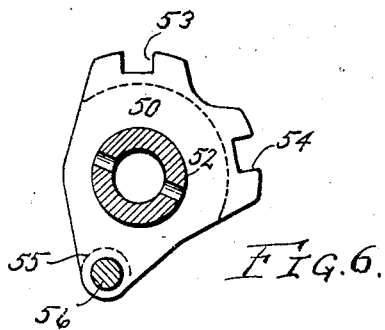
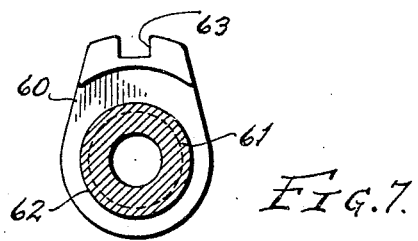
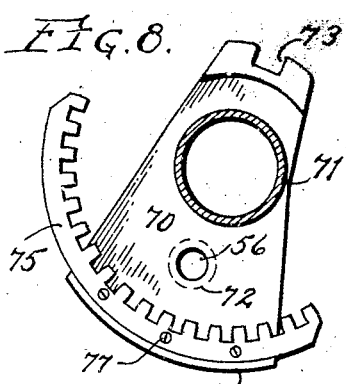
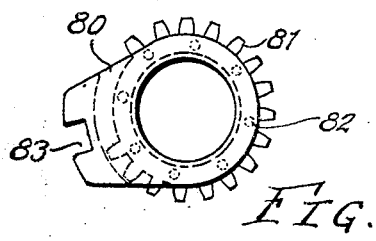
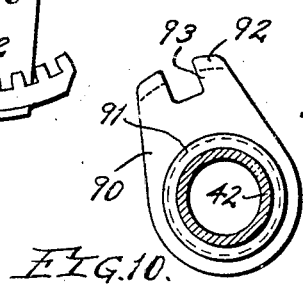

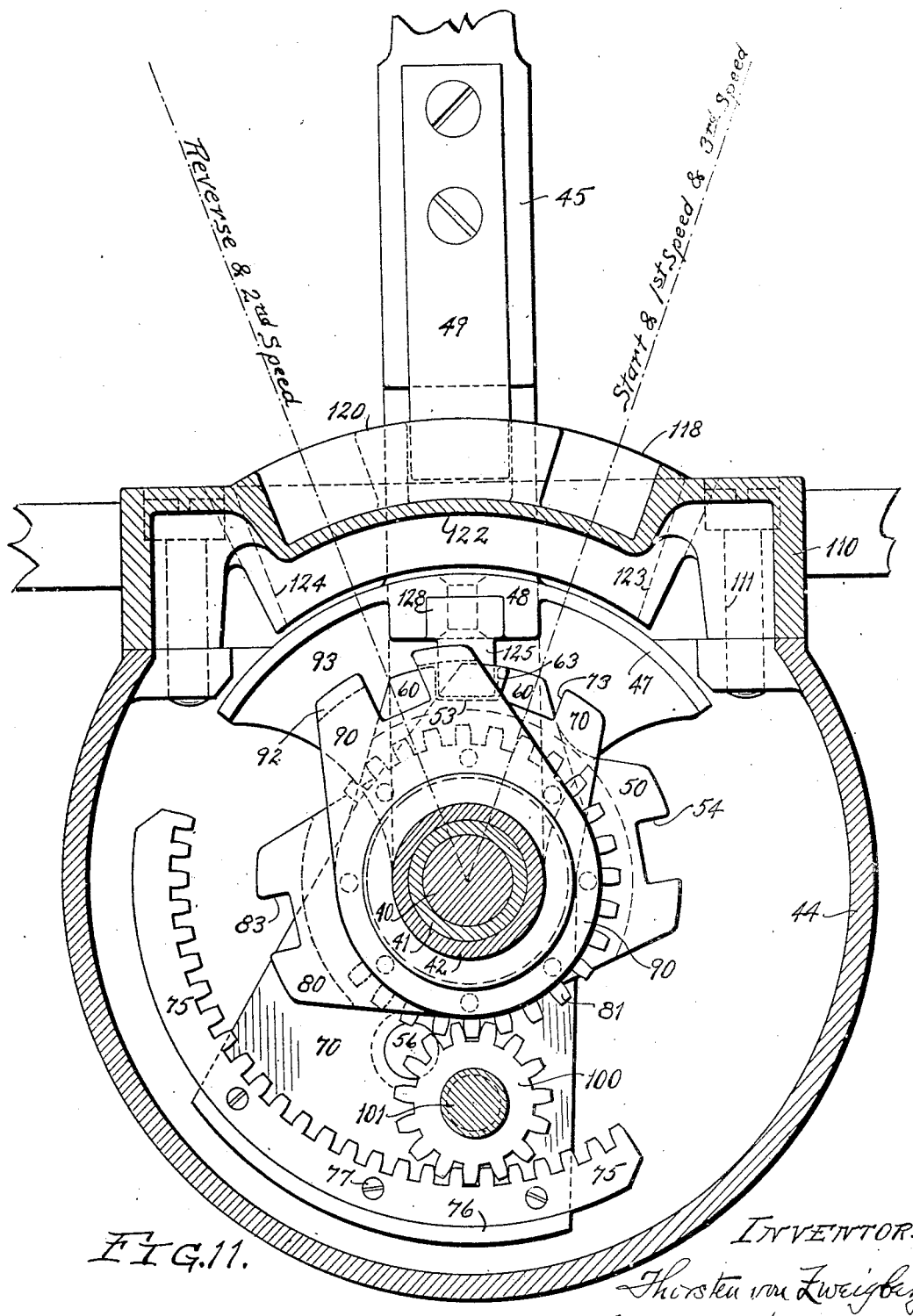

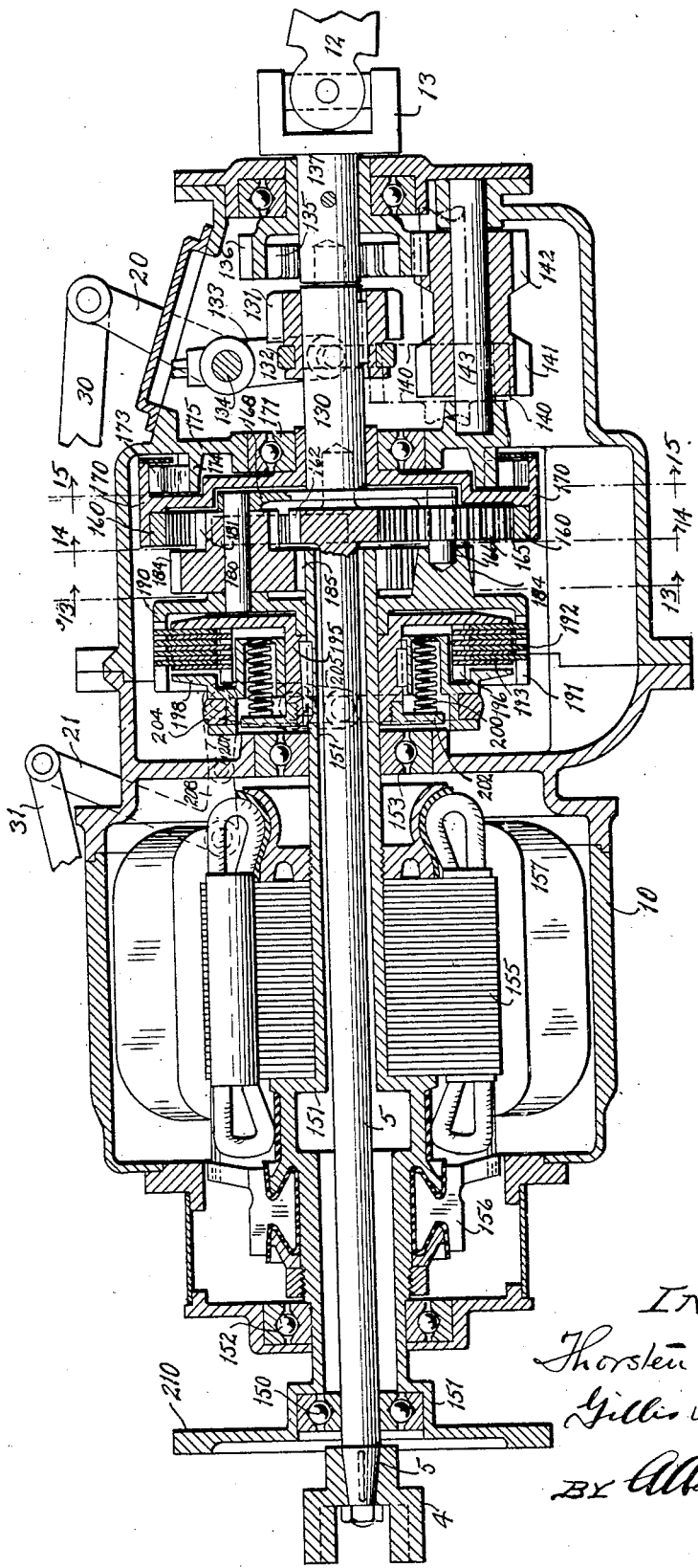

T. & G. VON ZWEIGBERGK.
CONTROLLING MECHANISM FOR AUTOMOBILES.
APPLICATION FILED NOV. 1, 1915.

1,287,171.

Patented Dec. 10, 1918.
7 SHEETS—SHEET 6.

INVENTORS;
Thorsten von Zweigbergk,
Gillis von Zweigbergk,
BY Albert T H Bates
ATT'Y

UNITED STATES PATENT OFFICE.

THORSTEN von ZWEIGBERGK, OF LANCASTER, AND GILLIS von ZWEIGBERGK, OF FULWOOD, PRESTON, ENGLAND; SAID GILLIS von ZWEIGBERGK ASSIGNOR TO SAID THORSTEN von ZWEIGBERGK.

CONTROLLING MECHANISM FOR AUTOMOBILES.

1,287,171.  Specification of Letters Patent.  Patented Dec. 10, 1918.

Application filed November 1, 1915. Serial No. 58,977.

*To all whom it may concern:*

Be it known that we, THORSTEN VON ZWEIGBERGK and GILLIS VON ZWEIGBERGK, citizens of the United States, residing at Lancaster, in the county of Lancaster, England, and at Fulwood, Preston, county of Lancaster, England, respectively, have invented a certain new and useful Improvement in Controlling Mechanism for Automobiles, of which the following is a full, clear, and exact description, reference being had to the accompanying drawings.

An application of ours filed November 1, 1915, Serial No. 58,976, shows, describes and claims a system of change speed gearing wherein there is a mechanically connected low gear, an electrically controlled intermediate gear, and a directly connected high speed. The electric control is accomplished by means of an armature which is rotated idly at low speed and, by being short circuited, changes the reaction of the gearing to pass to second speed. The electric machine provided may also be availed of for self starting and for charging the battery on the vehicle.

The object of this invention is to provide simple and effective controlling mechanism for the change speed gear described, as well as for the electric machine when it is a self starter, or to enable it to act as a drag on the drive shaft so that it may constitute an electric brake in coasting.

In the preferred form the change speed gearing described is planetary, the planet wheel engages a free wheel, which, on low speed, is stationary and takes the reaction, and the armature is mounted on a sleeve which surrounds the drive shaft and is geared with the planet wheel so that, on low gear, the armature revolves idle in the opposite direction from the drive shaft. Accordingly, retarding the armature, by short circuiting it, causes its gear to take the reaction, and the free wheel then travels, adding speed to the driven shaft. For high gear, a suitable clutch connects the armature, drive shaft and driven shaft to revolve as a unit. A reversing gear of any satisfactory type may be provided between the driven shaft and the propeller shaft of the vehicle, this reversing gear including a separable clutch enabling the entire disconnection of these parts.

In the present invention, a suitable controller is provided for effecting the changes in the electric circuit, and our mechanism provides a single shiftable lever which is adapted, at will, to operate the controller for effecting the electric changes, the clutch in the change speed gearing for passing from intermediate to high speed, and the clutch and reverse gear for determining the transmission to the propeller shaft. Accordingly, different positions of this lever provide for the following conditions, namely; "starting", "off", "reverse", "first speed", "second speed", "third speed", "electric brake".

The invention can be best summarized as consisting of the combinations of mechanisms for accomplishing the above ends, or some of them, as herein exemplified, it being understood that the drawings and the specific description thereof illustrate simply one preferred embodiment of the invention, and that various changes and alterations may be made without departing from the invention.

Figure 14:
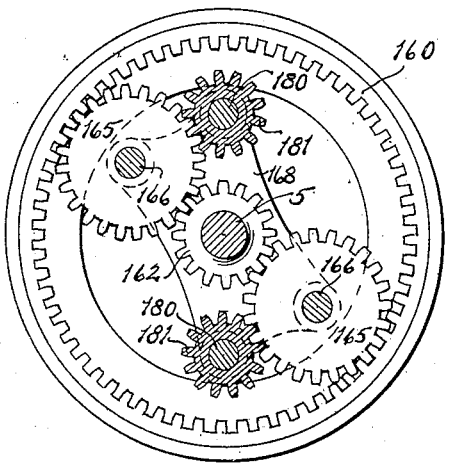
Figure 15:
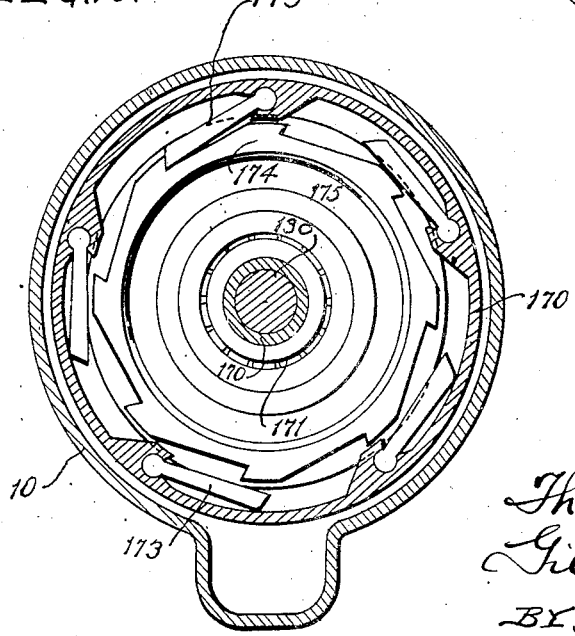
Figure 16:
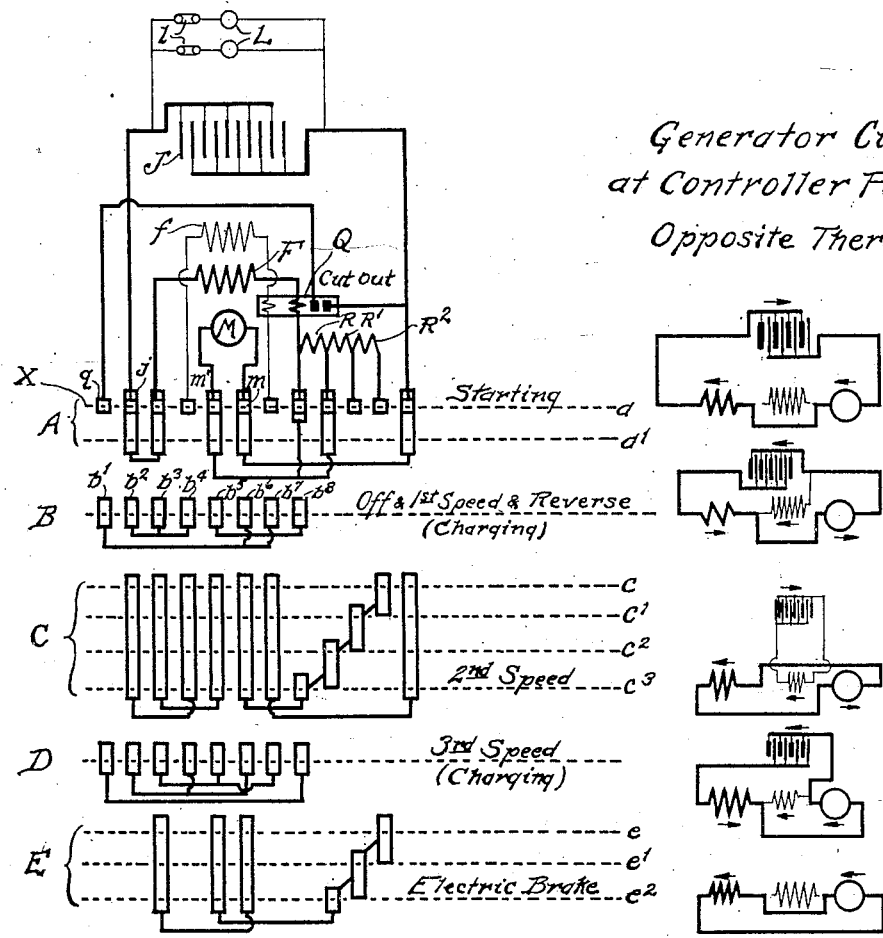

In the drawings, Figure 1 is a sectional side elevation of our controlling mechanism, the parts being shown in starting position; Fig. 2 is a vertical section of the controller in a plane parallel with Fig. 1; Fig. 3 is a somewhat diagrammatic cross section at right angles to Fig. 1 toward the rear of the vehicle. Figs. 1, 2 and 3 are drawn on the same scale. Figs. 4 to 10, inclusive, illustrate the mechanism connecting the hand lever with the various parts controlled thereby, these views being on the same scale, which is larger than the scale of the preceding figures. Fig. 4 is a section on a plane parallel with Fig. 3; Fig. 5 is a sectional plan of the parts shown in Fig. 4; Figs. 6 to 10 inclusive are details respectively of five gates, which are shown nested together in Fig. 4, and with which the hand lever coacts. These views show the respective gates in the angular positions they occupy when the hand lever is in the neutral or "off" position shown in Figs. 4 and 5. Fig. 11 is a vertical section on an enlarged scale on the line 11—11 of Fig. 4, showing the various gates referred to in the off position;

Fig. 12 is a vertical longitudinal section through the gearing and motor, being along the axis of the drive shaft, or in a plane parallel with Fig. 1. The gearing portion of this view is on the two planes indicated by the line 12—12 on Fig. 13. Figs. 13, 14 and 15 are transverse sections illustrating the gearing, being taken on the correspondingly numbered lines in Fig. 12. Fig. 16 is a diagram illustrating the controller and the various electric connections made thereby.

In Fig. 1, the reference numeral 1 designates one of the members of a clutch connected with a suitable internal combustion engine, not shown, but supposed to be beyond the left hand end of this figure. 2 indicates the coöperating member of the clutch, which is connected by a slidable coupling 3, 4 with a drive shaft 5. 6 indicates a foot lever for controlling the clutch 1 and 2.

The drive shaft 5 extends rearwardly within a casing 10, which is supported by suitable means, not shown, from the chassis frame, indicated by broken lines 11. 12 indicates the main propeller shaft of the vehicle, which is connected by a universal joint 13 with a shaft extending into the casing 10, and which may be free or coupled with the drive shaft. As hereinafter described, there are located within the casing a driven shaft between the drive shaft and propeller shaft extension, and a clutching and reversing gear for connecting the driven shaft directly to the propeller shaft, or through gearing which will change the direction of rotation. There is also located within the casing an electric motor which, as hereinafter explained, forms the control at second speed and is also available for charging the battery, for starting and for electric braking. There is also located within the casing a clutch for coupling the drive and driven shafts directly for high gear.

20, in Fig. 1, indicates a rock arm, the operation of which controls the clutching and reversing gear connection between the driven and propeller shafts. 21 indicates a rock arm which controls the high speed clutch,—these clutching mechanisms being shown in Fig. 12 and described hereinafter. 22 indicates a rock arm which operates the controller barrel. As shown in Fig. 2, the arm 22 is on a shaft 23 which carries a segment 24 geared with a pinion 25 on the controller barrel, this barrel having arcual contact plates 26 coacting with fingers 27. The three rock arms mentioned are connected by three links 30, 31 and 32 with three rock arms 33, 34 and 35, which are mounted on concentric axes independently of each other, and are adapted to be selectively operated by the hand lever 45.

As shown in Fig. 3, the rock arm 35, linked with the controller, is rigid on a shaft 40. The arm 33 linked with the reverse gear is rigid on a sleeve 41 loosely surrounding the shaft. The arm 34 linked with the high speed clutch is rigid on a sleeve 42 loosely surrounding the sleeve 41. The shaft 40 has a bearing in the casing 44 secured to the chassis frame. Loosely mounted on the shaft 40 is an operating lever 45 which may slide on the shaft and turn on it independently of it. Suitable connecting mechanism is provided by which this lever may operate the shaft and sleeves to accomplish the mechanical, electrical and combined mechanical and electric connections desired.

The operation of the connecting mechanism will be best understood after a description of the specific construction illustrated in Figs. 4 to 11 inclusive. First, there is rigidly secured to the shaft a gate 50 of the form shown in Fig. 6, and in neutral position having the angular position there shown. A suitable pin 51 extending through the hub 52 of the gate provides means for securing it. The gate has an arcual widened portion which carries two notches 53 and 54. The gate also has a boss 55 in which seats a pin 56 connecting the gate with the gate 70, hereinafter described. Next to the gate 50 and loose on the shaft 40 is the gate 60, shown detached in Fig. 7. This gate is rigidly secured to the sleeve 41; it is shown in the drawing as made an integral part thereof. The gate has a hub 61 providing a recess 62 on the opposite side, which overhangs the hub 52 of the gate 50. A thickened arcual portion of the gate carries a notch 63. Next to the gate 60 is a gate 70 which has a hub 71 loosely journaled on the hub 61 of the gate 60. As heretofore stated, this gate is pinned by the pin 56 to the gate 50, the pin occupying a boss 72 of the gate 70. The lower portion of the gate carries an internally toothed segment 75, the segment being shown as resting against a flange 76 of the body of the gate and secured by screws 77. In the thickened arcual upper portion of the gate is a notch 73. Journaled on the hub 71 of the gate 70 and occupying a recess between that hub and the thickened arcual portion carrying the notch 73 is the gear 81 (Fig. 9) secured by rivets 82 to the side of the gate 80. This gate has an arcual portion carrying a notch 83. The gate is journaled on the hub 91 of the gate 90, hereinafter described. Between the gear 81 and the internal gear 75 and meshing with each of them is an idle pinion 100 mounted on a stud 101 projecting from the casing 44. The last of the gates is designated 90. It is journaled on the sleeve 41 and is rigid on or formed integral with, the sleeve 42, and has a notch 93. The gate 80, in the off position, extends in a direction at an angle to the gate 90, but in another position extends in the same direction, when its edge is overhung by an arcual portion 92 of the gate 90. In such neutral position the notches 83 and 93 aline.

All of the notches 53, 54, 63, 73, 83 and 93 have their bases the same distance from the axis, and, accordingly, any of those notches, when in the highest position, is adapted to be engaged by a key on the shifting lever 45. This lever is shown as having an elongated hub 46 enabling it to easily slide on the shaft 40, and as having on its shank above this hub an arcual guard 47 adapted to lie beneath and normally close an opening in the top plate 110 hereinafter described. This guard has a boss 48 on its under side, to which is secured a block 128 having two downwardly extending teeth or keys 125 and 126. These keys extend inwardly toward the axis of the shaft a sufficient distance to engage in the notches of the gates described.

The keys 125 and 126 are positioned apart longitudinally a distance slightly greater than the combined thickness of the gates as they stand in position. Accordingly, when a key 125 is in engagement with any of the notches described, the key 126 is idle. Any still further movement of the shifting lever to the right carries the key 125 into the space between the gate 90 and the vertical wall 127 of the casing, so that this key is in idle position when the key 126 comes into position to engage a notch of the gate 50. In this last position of the parts the key 125 is shown in dotted lines in Fig. 4.

The horizontal guard plate 110 referred to is adapted to form the top of the casing 44, being shown as secured thereto by screws 111. Downward walls 123 and 124 of this plate form abutments limiting the swing of the lever 45. The top plate has a series of connected upwardly facing grooves adapted to be occupied by a finger or bar 49 secured to and extending downwardly from the lever 45. These grooves are provided by ribs rising from a floor portion 122. This finger coöperates with the grooves of the guard plate to determine the position longitudinally of the shaft of the operating lever 45. Figs. 3, 4, 5 and 11 show the operating lever in off position. In this position, the key 125 engages the notch 63 of the gate 60 on the sleeve 41, which operates the reverse gear.

As shown in Fig. 5, the lever 45, when in off position, may have a movement forward or back (that is, about the axis of the shaft 40), or a movement in the left hand direction in Fig. 5, which is toward the right side of the vehicle. In such longitudinal movement, the finger 49 would pass through the notch between the ribs 113 and 115 of the guard plate and could then swing in the rearward direction in the space 114 at the left of the rib 115. From its neutral position the lever can swing in either direction in the space 112. At the rear end of the space 112 the lever may be moved laterally in the right hand direction (Fig. 5) across the end of the rib 116 into the groove 117. In this space it can swing arcually to the opposite side of the plate, can then be moved longitudinally across the front end of the rib 118 into the groove 119, and, in this space, it can be moved rearwardly and then across the end of the rib 120 into the space 121.

It may be here noted, as designated on Fig. 5, that the groove 112 in which the finger normally stands provides for reversing and first speed forward, the groove 117 for second speed, the groove 119 for third speed, the groove 121 for the electric brake, while the space 114 at the other side of the off position is for self starting. This will become apparent from the following description of the operation of the parts described.

In the neutral position shown in Figs. 5 and 4, the finger 49 is in the slot 112 and the key 125 is in engagement with the notch 63 of the gate 60, which is rigid with the sleeve 41. This sleeve is connected by the arm 33 and link 30 with the reversing arm 20 which, as explained, controls the clutching gear which connects the driven shaft with the propeller shaft, either directly or in reversed rotation. Fig. 12 shows the driven shaft designated 130. Splined to this shaft is shown a gear 131 having an annular groove into which extends a collar 132 on a rock arm 133 rigid on the rock shaft 134, on which the arm 20 is secured. This gear 131 is adapted to act as a dental clutch sliding into locking engagement with the internal teeth 135 of a gear 136 rigid on the shaft 137, which carries the universal joint 13 connected with the propeller shaft 12.

When the lever handle 45 is in the upright or neutral position shown in Figs. 3, 4, 5 and 11 the gear 131 is in the position shown in Fig. 12, and the propeller shaft is disconnected from the driven shaft. Now, if the lever 45 be thrown toward the rear of the car into the position shown in full lines in Fig. 1, it will rock the sleeve 41 in a right hand direction (Fig. 1), pulling on the link 30, shifting the gear 131 toward the rear into engagement with the internal teeth 135, thus locking the driven shaft 130 to the propeller shaft 12. On the other hand, if the lever 45 be thrown forwardly, it will push on the link 30 and shove the arm 20 rearwardly, shifting the gear 131 into mesh with the idler 140, shown in broken lines in Fig. 2, which meshes with a gear 141 loose on a lay shaft 143. An extension 142 of this gear meshes with external teeth of the gear 136. Accordingly, this position of the parts would cause the driven shaft 130 to drive the propeller shaft in the reverse direction. The intermediate position between these two extremes of the gear 130, which is the position of the linkage shown in Fig. 1, leaves the parts at off position.

It will be seen that, when the lever stands in off position, the mechanical drive, either forward or rearwardly, may be engaged by throwing the lever in either one direction or the other. The shifting of the lever laterally toward the right side of the car (left in Fig. 5) brings it into position for controlling the self starter, as hereinafter described.

From the extreme rear position of the lever, when the car is driving on low speed forwardly, the lever may be shifted toward the longitudinal center of the car to bring it into the groove 117. As it comes in this position, the key 125 engages the notch 73 of the gate 70. The movement of this gate, by reason of the pin 56 connecting the gate with the self starter gate 50, provides a movement of the shaft 40 which operates the controller to gradually short circuit the armature, as hereinafter described. In addition to this, the movement of the gate 70, by reason of the segment 75, rotates the pinion 100 in the direction to swing upwardly the gate 83 so that, as the lever comes into the second speed (which is the forward limit of the lever in the groove 117), the notch 83 has swung into registration with the notch 93 of the gate 90, the gate 83 lying within the overhanging arcual portion 92 of the gate 90. Accordingly, when the lever reaches its second speed position it may be moved toward the longitudinal center of the car to aline with a groove 119, and, in so moving, the key 125 engages both the notches 83 and 93. Then, if the lever be moved rearwardly in the groove 119, it turns the sleeve 42 directly by reason of the gate 90 and it turns the controller shaft 40 in the opposite direction by reason of the gate 80 turning the gear 81, idler 100, segment 75, gate 70, pin 56 and gate 50. The mechanical operation of this movement of the lever through the groove 119 is to swing the arm 34 forwardly, drawing on the link 31, which swings the lever 21 forwardly in Figs. 1 and 12, and causes the setting of the high speed clutch, which couples the drive shaft 5 and the driven shaft 130 together, as hereinafter described. Accordingly, there is in this position a direct forward drive from the engine to the propeller shaft, known as third speed.

In the third speed position, the lever is adapted to have one more shift toward the longitudinal center of the car. In such shift, the key 125 passes out of engagement with the notches 83 and 93 into the space between the gate 90 and the wall 127 and, at the same time, the key 126 comes into engagement with the notch 54 of the gate 50, which has been brought to the uppermost position when the lever moved to third speed. If now the lever is moved forwardly in the groove 121, it again operates the controller through the gate 50 and, as hereinafter explained, closes the armature through suitable resistance, allowing a drag or braking action on the drive shaft. This makes a very effective throttle for coasting. In this coasting movement, the sparking circuit or gasolene supply may be shut off and the engine turned over by momentum of the vehicle, or the engine may be disconnected at the clutch 1 and 2 by the foot lever 6, and the electric throttle alone relied on.

It has been assumed in the above description that the gates remain in the position in which the lever leaves them until again moved by the lever. Friction may be availed of to so hold them, or any suitable detent mechanism may be provided. It will have been noted that the connections at reverse, first speed and third speed are primarily mechanical; that the starting, second speed, and electric brake conditions are primarily electrical. Before describing the controller which effects the electric changes, we will describe the gearing and the electric machine shown in Figs. 12 to 15 inclusive.

Referring now to Figs. 12 to 15 inclusive, it will be seen that the drive shaft 5 is mounted at its rear end in the driven shaft 130, and at its forward end in a bearing 150 in a sleeve 151, which sleeve has bearings 152 and 153 in the casing 10. The sleeve carries field magnets and windings 157. The electric machine shown is compound-wound and may act either as a generator or motor.

Formed on or carried by the drive shaft 5, is a pinion 162 which constitutes a sun wheel, and engaging with this sun are planet gears 165. 160 designates an internal gear which meshes with the planets on their outer sides. Two planets are shown, though their number may be varied as desired. These planets are journaled on studs 166 which project from a spider 168 mounted on the forward end of the driven shaft 130. The internal gear 160 is mounted within a flange of a free wheel 170, the hub of which surrounds the driven shaft 130, and has a bearing 171 in the casing 10. The free wheel carries pawls 173 which coöperate with a stationary ratchet 174 carried by a web 175 in the casing. The pawls prevent the free wheel turning in the direction in which it tends to turn when the drive shaft 5 rotates in the direction in which the engine drives it.

Under the above described conditions, the internal gear constitutes a reaction member for the planets 165 which are rotated in the direction of the arrows in Fig. 14, and accordingly the rotation of the driving shaft causes the planets to travel bodily, thereby rotating the spider 168 in the right-hand direction (Fig. 14), giving the same rotation to the driven shaft 130, but with a much lower speed, than the rotation of the drive shaft. This constitutes the low gear drive, which, it will be seen, is independent of any electric action. The gearing being permanently in mesh all that is necessary to throw the engine into low gear is to close the clutch between the driven shaft and the propeller shaft, which, as described, is done by rearward movement of the hand lever 45 when the finger 49 is in the slot 112.

Secured to the spider 168 are one or more studs 180 on which are journaled pinions 181 meshing with the planet gears 165. Formed rigidly with these pinions are larger gears 184 which mesh with a central pinion 185 rigidly secured to the rear end of the sleeve 151. Accordingly, when the low gear is operated, the pinions 181, 184 are bodily traveling and are also rotated in the right-hand direction, and this gives a left-hand rotation to the sleeve 151, which accordingly is rotated in the opposite direction to the driven shaft. Thus on low gear the armature rotates freely in the opposite direction to the drive shaft. Such movement, as stated, is without effect so far as the driving is concerned. The controller hereinafter described, however, utilizes it for generating current for charging the battery.

To pass from low to intermediate or second gear, it is only necessary to retard the rotation of the sleeve 151. This is very readily accomplished by short circuiting the armature. The controller does this by steps through suitable resistance. The effect of this retardation is as follows:

When the central wheel 185 cannot rotate as fast as the rotation of the driving shaft and gearing tends to rotate it, it becomes a reaction member, holding back the rotation of the gears 184 and 181, and this holds back the rotation of the planets 165, which, accordingly, draw with them the internal gear 160 to the extent to which their rotation with reference to such gear is prevented. That is to say, if the armature were held immovable, the central gear 185 would be stationary, the gears 184 could only revolve as they travel bodily around the axis of the drive shaft, and this reduces the peripheral speed of rotation of the planets below the peripheral speed delivered by the driving pinion 162, wherefore the planets act to some extent as a transmitter of rotation from the sun 162 to the internal gear 160, which thus overruns, the result being that the studs 166 carrying the pinions travel bodily at faster speed than before, and thus second speed is transmitted to the driven shaft 130.

To pass to high gear, it is simply necessary to clutch the driving and driven shafts together, causing these two shafts, the planetary gearing, the armature and the sleeve, to rotate as a unit, the free wheel overrunning and its pawls being kept out of engagement with the stationary ratchet by centrifugal force. Fig. 12 shows a simple and effective clutch of the multiple disk type for accomplishing this result, which will now be described:

Loosely journaled on the sleeve 151 is a wheel 190 rigidly connected with the spider 168, as, for instance, by the studs 166 and 180. 191 indicates an overhanging flange on the member 190, having longitudinal slots occupied by outward extensions of disks 192. Within the flange 191 is a member 195 surrounding and keyed to the sleeve 151. This member forms an abutment for one side of the set of disks and carries projections 196 engaging inner extensions of the alternate disks 193. Surrounding the hub of the member 195 and slidable longitudinally on it but compelled to rotate with it, is a member 198 which forms a clamp for the other side of the multiple disks.

By shifting the member 198 toward or from the member 195, the clutch is engaged or freed. Springs 200 mounted in recesses in the member 198 and bearing against a flange 202 threaded on the member 195, tend to cause engagement of the clutch. Disengagement is accomplished by drawing the member 198 toward the left. We have shown a collar 204 mounted in an annular groove in the member and connected with one arm of a lever 205. The upper arm 206 of this lever is linked by a link 207 with an arm 208, which forms a portion of the bell crank lever 21. This lever is connected by the link 31 with the shifting mechanism described.

When the hand lever 45 is in the third speed position the lever 21 has been swung forward and the clutch members thus subjected to the action of springs which clamp the disks. In this position the drive shaft, driven shaft and armature rotate as a unit. The armature is idle so far as driving is concerned, but the controller preferably connects it with the battery so that it is generating at that time.

When the engine is disconnected from the driving shaft by operating the clutch lever 6, a further movement of this lever applies a brake to the armature, preventing its rotation by momentum. For this purpose we have provided a disk 210 at the forward end of the armature sleeve 151, and we have provided a disk 211 on the clutch member 2 and between these parts we have mounted a solid fiber block 212 slidably carried in a bracket 213 secured to the frame. The rearward movement of the clutch member 2 thus causes its disk to force the block against the disk 210, stopping the rotation of the armature.

If the high speed clutch is in engagement at this time this makes a brake for the vehicle, as it acts directly on the transmission. As the high speed is the natural condition when the vehicle is running forwardly, there is thus always available a foot brake simply by forcing the clutch pedal forward, this being of course in addition to such brakes as may be employed on the wheel drums.

We will now describe the controller, this is in action in starting position to couple the electric machine as a motor with the battery; in first and third speed positions to charge the battery; in second speed and electric brake positions to short circuit the armature. The mechanical characteristics of this control may be of any desired construction. Its electric operations will be understood from the diagram, Fig. 16.

In the diagram A, B, C, D and E indicate rows of contact plates on the controller barrel, which correspond respectively to the starting position; the first speed; off or reverse; the second speed; the third speed; and the electric brake. X indicates a row of contact fingers adapted to be caused to occupy the relative positions with reference to the plates indicated by dotted lines. M indicates the armature of the motor; F the series field winding therefor; and $f$ the shunt field winding. J indicates a storage battery; L suitable lights, and $l$ switches for controlling the lights. Q is a cut out of any suitable type, having windings in series with the series field and with the shunt field respectively of the motor, and operating to open the circuit when the current generated by the generator is overbalanced by the battery current, due to diminution of speed of the generator. R, R′, R², indicate resistances. The lines connecting the contact plates are suitable conductors, and the other lines indicate circuits or conductors connecting the other parts as shown. The right-hand portion of the diagram indicates the circuits through the armature and one or both fields of the generator or motor and the battery, in the various controller positions directly opposite thereto.

As the cut out Q is open when the generator is idle, so that the battery cannot run down, it is immaterial what connections exist at the off position, but we find it convenient to utilize the first speed connections of the controller for the off position, so that no controller movement is necessary when the operating lever goes to first speed. This off and first speed connection is indicated at B in the diagram, assuming that the row of contact fingers X is superimposed on the row of plates B.

Tracing the circuit in the off position: from the armature this circuit passes from the finger $m$ to the contact plate $b^6$, to the plate $b'$, to the finger $q$, through the cut out Q, through the battery J, to the finger $j$, to the contact plate $b^2$, thence from the contact plate $b^3$ through the series windings F, to the plate $b^8$, to the plate $b^5m$ thence to the finger $m'$ and back to the armature. The shunt passes from the segment $b^6$ to the segment $b^7$, thence through the shunt winding $f$ to the segment $b^4$, thence to the segment $b^3$, joining the series circuit. In this position, therefore, the generator, which it will be remembered is running idle so far as driving is concerned, is charging the battery. The shunt is opposing the series field, but is overbalanced by it. This condition is indicated in the circuit diagram in the right-hand portion of Fig. 16, opposite the line B.

Without tracing the circuits specifically for the different positions, it will be seen that in the second speed position indicated by the line $c$, the armature is closed on the series field, through all the resistances R, R′, and R², and the shunt is separately excited by the battery in the direction to assist the main field. In the position $c'$, the resistance R² is cut out; in position $c^2$, resistances R² and R′ are cut out; in position $c^3$, all the resistances are cut out, and the armature is short circuited.

In position D, which is the third speed, the armature is again idle so far as the driving is concerned, but it is also charging the battery, and as in this position the armature rotation is reversed from the rotation at first speed and controller connections are likewise reversed. In the electric braking position E, the armature is short circuited in the same direction with the series field, and the shunt is cut out. The connections at the successive positions $e$, $e'$ and $e^2$ are respectively, through the entire resistance, through the resistances R′, R², and through the resistance R.

The starting position is shown on the opposite side from the off position. In this position the connections are such as to close the armature and main field through the battery in the direction for the battery to rotate the armature, the shunt being disconnected. The first starting position indicated at $a$, includes the resistance R in the short circuit, but the final position $a'$ omits the resistance.

Having described our invention what we claim is:

1. In an automobile controlling system, the combination with change speed driving gearing, of a dynamo driven by the gearing at the low speed thereof and so connected with a part of the gearing that the retarding of the dynamo increases the speed transmitted, a controller and circuits for short circuiting the dynamo, a clutching device between the change speed gearing and the propelling member of the vehicle, and a controlling lever adapted to be connected to operate the controller and the clutching device.

2. In an automobile controlling system, the combination with change speed driving gearing, of a dynamo driven by the gearing at the low speed thereof and so connected with a part of the gearing that the retarding of the dynamo increases the speed transmitted, a controller and circuits for short circuiting the dynamo, a clutch adapted to connect the armature directly with the drive shaft for a still higher speed, and a controlling lever adapted to operate the controller and said clutch.

3. In an automobile charging system, the combination of change speed gearing of the sun and planet type, a dynamo having its armature geared with the planet gear, another gear engaged with the planet gear, means for obtaining reaction against said other gear when the armature is rotating idly, a controller adapted to short circuit the armature to change the reaction of the gearing to the armature, allowing said other gear to overrun, a driven shaft adapted to be rotated by the bodily travel of the planet gearing, means for connecting the driven shaft with the propelling member of the vehicle, and an operating lever adapted to operate said connecting means and also the controller.

4. In an automobile controlling system, the combination with a change speed gear of the sun and planet type, of a dynamo having its armature geared with the planet gear, another gear engaged with the planet gear, means for obtaining reaction against said other gear when the armature is rotated idly, and a controller and circuits for short circuiting the armature, a clutch adapted to connect the armature rigidly with the gearing, whereby it rotates as a unit therewith, an operating lever, and mechanism connected therewith for operating the controller and said clutch.

5. In an automobile controlling system, the combination with change speed gearing, of a dynamo, the armature of which is geared with the gearing to be rotated on low speed, the short circuiting of which armature changes from low to a higher speed, a clutching device between the change speed gearing and the propelling part of the vehicle, a controller for the dynamo, a shaft, a sleeve surrounding the shaft, individual connections from the shaft and sleeve to the controller and clutching device, an operating lever, and means for engaging it with either the shaft or the sleeve.

6. In a controlling system for automobiles, the combination of a shaft, a sleeve surrounding the shaft, gates on the shaft and sleeve respectively, a shiftable lever adapted to be engaged with the respective gates, change speed gearing, a dynamo having its armature geared with said gearing, a controller and circuits for the dynamo, a clutching device between the change speed gearing and the propelling part of the vehicle, and connections from the clutching device and controller, one leading to said shaft and the other leading to said sleeve.

7. The combination of a shaft, a pair of sleeves mounted concentrically about the shaft, gates on the respective sleeves and shaft, an operating lever adapted to operate either of the gates, change speed gearing, a dynamo, a controller for the dynamo, a clutching device between the change speed gearing and a propelling part of the vehicle, a clutch adapted to connect the armature rigidly with the gearing, and operating mechanism leading from the controller, the clutching device and the clutch to the sleeves and shaft.

8. In a controlling system for automobiles, the combination with an internal combustion engine, of change speed gearing driven thereby, a dynamo having its armature geared with said gearing and adapted to be rotated thereby, the connections being such that the retarding of the armature increases the speed transmitted, a clutching device between said gearing and a propelling part of the vehicle, a battery, a controller and circuits adapted to establish the battery circuit through the dynamo to cause it to be a motor for starting, a lever, and mechanism operated thereby for operating the clutching device and the controller.

9. The combination with change speed reaction gearing having a rotary pinion-carrying casing, of a driven shaft rigid with said casing, a dynamo having its armature geared with said gearing, a vehicle carrying the parts mentioned and having a propeller shaft, means for establishing or interrupting communication between said driven shaft and propeller shaft, a battery on the vehicle, and means for connecting the same with the dynamo to drive it as a motor.

10. In a controlling system of the character described, the combination, with a driving shaft, of change speed gearing driven thereby, a compound wound dynamo having its armature connected with said gearing, said armature being rotated idly on low speed, means for short circuiting the armature to retard it and thereby change the reaction of the gearing, a battery, and means for separately exciting the shunt field from the battery when the armature is short circuited at second speed.

11. The combination with a three speed change gearing, of a drive shaft for operating the same, a driven shaft, a dynamo having its armature geared with said gearing, the armature being rotated mechanically at the low speed of the gearing, a clutch for connecting the armature directly with the drive shaft for third speed, a battery, and a controller adapted to connect the dynamo with the battery on low speed to charge the battery and adapted to short circuit the dynamo to cause the change to second speed, and adapted on third speed to connect the dynamo with the battery with the armature reversed.

12. The combination with change speed gearing, of a dynamo geared therewith and rotated at the low speed of the gearing and so connected therewith that the retarding of the dynamo increases the speed transmitted, and a controller adapted to short circuit the dynamo to retard it and cause the change of speed, said controller also having a position where it short circuits the dynamo with the armature reversed to constitute an electric brake.

13. The combination with change speed gearing, of a compound-wound dynamo having its armature geared with the gearing in such manner that the retarding of the armature increases the speed transmitted, means for clutching the armature rigidly with the gearing to effect third speed, a battery and a controller adapted to successively make connections as follows, namely; on low speed to connect the dynamo with the battery for charging, on second speed to short circuit the dynamo and separately excite the shunt by the battery, and on third speed to connect the dynamo with its armature reversed to the battery.

14. The combination, with change speed gearing, of a dynamo having its armature geared with a part of the gearing, a battery and a controller adapted to successively connect the dynamo and battery as follows, namely; connecting the dynamo with the battery so that the dynamo may be driven thereby as a self starter, then connecting the dynamo with the battery for charging the battery on low speed, then short circuiting the dynamo to effect second speed, then connecting the dynamo with the battery with the armature reversed for third speed, and then short circuiting the dynamo with the armature reversed for electric brake.

15. The combination, with change speed gearing, of driving and driven shafts connected therewith, a sleeve surrounding the driving shaft and geared with the change speed gearing, a motor having its armature on said sleeve, and means for applying a friction brake to said sleeve.

16. The combination, with change speed gearing, of a drive shaft connected therewith, a sleeve surrounding the drive shaft and geared with the change speed gearing, a dynamo having its armature on said sleeve, means for electrically controlling the dynamo, a brake member on the forward end of said sleeve, an engine adjacent to such end, a clutch adapted to connect the drive shaft with the engine, and means whereby a continuation of the releasing movement of the clutch may apply a brake to said braking member.

17. The combination with an engine, of a drive shaft, a clutch adapted to connect them, a sleeve surrounding the drive shaft, a disk on said sleeve, a longitudinally movable friction member adapted to be moved by the continuation of the releasing movement of the clutch into frictional engagement with the disk, a gear on said sleeve, a driven shaft, a planetary gearing between the drive shaft and driven shaft, said gearing being geared with the gear on the sleeve.

18. In a controlling device for automobiles, the combination of gates side by side, a shiftable lever having a key adapted to engage successive gates, a guard plate having upwardly facing communicating grooves, said lever extending upwardly at the side of such grooves and having a downwardly extending finger adapted to enter the grooves from above.

19. In a controlling device for automobiles, the combination with concentric shafts having gates side by side with notches therein, of a shiftable lever having a key adapted to engage said notches selectively, a guard plate having upwardly facing communicating grooves, said lever extending upwardly beside the guard plate and overhanging it, and a downwardly extending finger carried by the lever and adapted to enter said grooves.

20. The combination with gates side by side and having notches, of a shiftable lever, a key carried by the lever to enter successive notches, a guard plate having an opening through which the lever extends and in which it may swing and shift, a guard carried by the lever for closing said opening, upwardly facing connected grooves, and a downwardly extending finger carried by the lever and entering said grooves, whereby the shifting of the lever is controlled.

21. The combination with change speed gearing which drives mechanically on low speed and third speed and electrically on intermediate speed, of a controller, movable gates connected respectively with the controller, the high speed clutch and the reversing gear, and a single lever adapted to be shifted to engage any of said gates.

22. The combination with change speed gearing and a dynamo, of a controller for the dynamo, a series of gates side by side alternately connected with the controller and a mechanical part of the change speed gearing, and a single lever shiftable to engage successive gates.

23. The combination with change speed gearing, of a high speed clutch and a clutching device adapted to connect the gearing with a propelling part of the vehicle, a dynamo driven by said gearing, a series of gates side by side, the alternate members of said gates being connected with the high speed clutch and the clutching device respectively, an intermediate member being connected with the controller, and a lever adapted to be shifted to engage said gates successively.

24. The combination with a set of gates side by side, a lever adapted to be shifted to engage one gate after another and after it has reached the last gate to engage the first gate, a controlling device operated by the first gate, a motor geared with the drive shaft and adapted to be connected by the controller for self-starting or as an electric brake.

25. The combination with a drive shaft, of a dynamo geared therewith, a controller for the dynamo, an operating lever, two gates with either of which the lever may engage, means connecting one of the gates with the controller, and means including a reversing gear connecting the other gate with the controller, whereby a movement of the lever in one direction may operate the controller in either of two directions.

26. The combination with two gates, a reversing gear connecting the two, a lever adapted to operate either gate, and a controller connected with one of the gates, whereby the same direction of movement of the lever may operate the controller in opposite direction, and whereby the movement of one gate in one direction will move the controller in the same direction as the opposite movement of the other gate.

27. The combination with a clutch, a gate for moving it, a controller, a gate for moving it, and a third gate adapted to be positioned by the controller gate into registration with the clutch gate, and a lever adapted to simultaneously engage the clutch gate and said third gate.

28. The combination with a controller, of a gate for moving it, an internally toothed segment carried by said gate, an idle pinion with which the segment meshes, said pinion being mounted on a stationary shaft, another gate geared with said pinion, and a shiftable lever adapted to engage either gate.

29. The combination with a controller, of a gate for moving it, a second gate, an idle pinion geared with the two gates, and a shiftable lever adapted to engage either gate, whereby the same movement of the lever may move the controller in either direction as desired.

30. The combination with a controller, of a movable gate connected therewith, another gate connected by a reverse gear with the gate first mentioned, a clutch, a third gate connected with the clutch, a shiftable lever adapted to engage the first gate mentioned individually and engage simultaneously the second and third gates mentioned.

31. The combination with a controller, of a gate for moving it, an internally toothed segment carried by the gate, an idle pinion with which the segment meshes, another gate geared with said pinion, a clutch, a third gate connected with the clutch, and a shiftable lever adapted to engage the first gate mentioned individually and engage the second and third gates simultaneously.

32. The combination with a controller, of a gate connected therewith, a reversing gear, a gate adjacent to the controller gate and connected with the reversing gear, another controller gate adjacent to the reversing gate and connected with the controller gate first mentioned, and a shiftable lever adapted to engage said three gates successively.

33. The combination with a controller, of a shaft connected therewith, a gate on the shaft, a sleeve on the shaft, a reversing gear connected with said sleeve, a gate on said sleeve adjacent to the controller gate, another controller gate loosely surrounding the sleeve adjacent to the reversing gate and connected with the controller gate first mentioned, and a shiftable lever adapted to engage said three gates respectively.

34. The combination with a controller, of a gate connected therewith, a reversing gear, a gate adjacent to the controller gate and connected with the reversing gear, another controller gate adjacent to the reversing gate and connected with the controller gate first mentioned, a fourth gate connected by a reversing gear with the third gate, and a shiftable lever adapted to engage said four gates successively.

35. The combination with a controller, of a gate connected therewith, a reversing gear, a gate adjacent to the controller gate and connected with the reversing gate, another controller gate adjacent to the reversing gate and connected with the controller gate first mentioned, a fourth gate connected by a reversing gear with the third gate, a clutch, a fifth gate connected with said clutch, and a shiftable lever adapted to successively engage the first three gates individually and then simultaneously engage the fourth and fifth gate.

36. The combination with a controller, of a shaft connected therewith, a gate on the shaft, a sleeve on the shaft, a reversing gear connected with said sleeve, a gate on the end of said sleeve adjacent to the controller gate, another controller gate loosely surrounding the sleeve adjacent to the reversing gate and connected with the controller gate first mentioned, a fourth gate, an idle pinion connecting it with the third gate, a high speed clutch, a sleeve connected therewith and surrounding the sleeve first mentioned, a fifth gate on the end of the clutch sleeve, and a shiftable lever adapted to successively engage the first three gates individually and then simultaneously engage the fourth and fifth gate.

37. The combination with driving mechanism, of a motor geared therewith, a controller for the motor, a clutching device adapted to connect the driving mechanism with a propelling part of the vehicle, a shaft connected with the controller for operating it, a sleeve surrounding the shaft and connected with the clutching device for operating it, adjacent gates on the sleeve and shaft, a shiftable lever, and a key carried thereby adapted to engage either gate.

38. The combination with change speed gearing, of a dynamo having its armature geared with a part of the gearing, a battery and a controller adapted to successively connect the dynamo and battery as follows, namely; connecting the dynamo with the battery so that the dynamo may be driven thereby as a self starter, then connecting the dynamo with the battery for charging the battery on low speed, then short circuiting the dynamo to effect second speed, and then connecting the dynamo with the battery with the armature reversed for third speed.

In testimony whereof we hereunto affix our signatures.

THORSTEN von ZWEIGBERGK.
GILLIS von ZWEIGBERGK.